July 6, 1937. H. C. RIPPEL Re. 20,439
FLASH REMOVER
Original Filed March 22, 1935 4 Sheets-Sheet 1
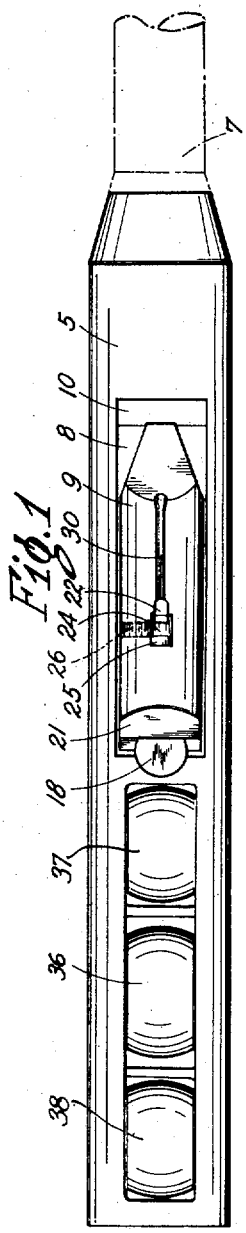
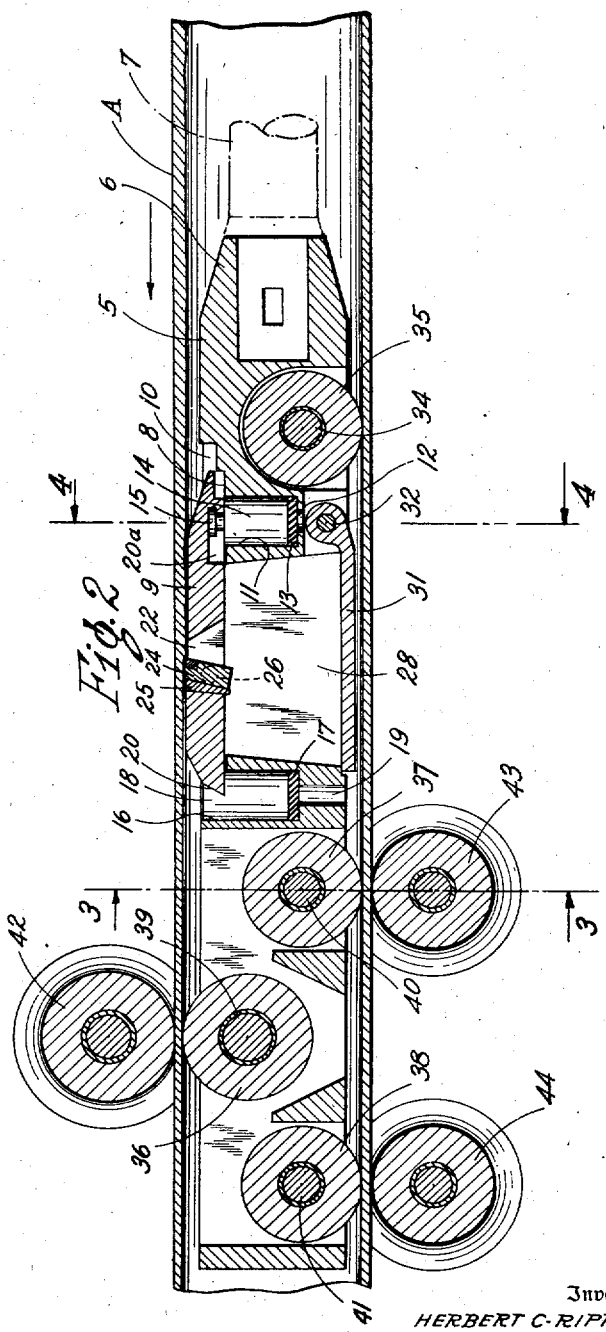
Inventor
HERBERT C. RIPPEL
BY Richey & Watts
Attorneys

FLASH REMOVER

Original Filed March 22, 1935 4 Sheets-Sheet 2

Inventor
HERBERT C. RIPPEL

BY Richey & Watts
Attorneys

FLASH REMOVER

Original Filed March 22, 1935 4 Sheets-Sheet 3

FLASH REMOVER

Original Filed March 22, 1935 4 Sheets-Sheet 4

Inventor
HERBERT C. RIPPEL

BY Richey & Watts
Attorneys

Reissued July 6, 1937

Re. 20,439

UNITED STATES PATENT OFFICE 20,439

FLASH REMOVER

Herbert C. Rippel, Youngstown, Ohio, assignor to Republic Steel Corporation, Youngstown, Ohio, a corporation of New Jersey Original No. 2,025,421, dated December 24, 1935, Serial No. 12,471, March 22, 1935. Application for reissue February 17, 1937, Serial No. 126,227

26 Claims. (Cl. 29—33)

This invention relates broadly to the manufacture of longitudinally welded tubular metal articles such as steel tube or pipe, and is more particularly concerned with apparatus for removing hot plastic welding flash or burr metal which is formed at the welded seam during welding.

In the manufacture of metal tube or pipe to which this invention particularly relates, the flat metal is formed into a tubular blank with longitudinally abutting edges which are welded together by the electric resistance butt weld method. During welding, longitudinal ridges of metal, commonly known as flash or burr metal, are formed on the welded seam, usually on both the inside and outside of the article. For many uses it is desirable, and for other uses it is essential, that the inside and/or outside of the tube should have smooth interior and/or exterior surfaces and should be free from projecting flash metal.

Heretofore, this flash metal has often been removed when cold. This method of removal usually requires transportation of the tube from the place of welding to another place for the flash removing operation, the time and labor of an extra operation, and the use of additional equipment and power to remove the cold metal.

Attempts have been made to remove the flash metal while in a hot plastic state, but several difficulties have been encountered, among which was that of preventing removal of too much or not enough flash metal, that of preventing clogging of the cutter with severed plastic metal, and that of disposing of the severed metal so as not to interfere with planishing of the seam immediately after removal of the flash metal.

The present invention avoids the disadvantages of prior devices and possesses many new advantages. It makes possible the severing of the fin, burr or flash metal, while hot and plastic, and passage of the severed metal away from the cutting tool without clogging or adhering to the latter. It also makes possible separate or simultaneous removal of the flash metal from the inside and outside of the tubular article. It also makes possible the planishing of the seam metal immediately after the severing of the flash metal and while the seam metal is still highly heated, thus eliminating tool marks and irregularities, refining the grains, and producing a smooth surface over the seam metal.

Apparatus embodying and capable of practicing this invention may be disposed closely adjacent to the point of welding, will automatically maintain its adjustment with respect to the pipe or tube when irregularities in the latter are encountered thus avoiding removal of too much or too little metal, will possess long cutting tool life with longtime use before resharpening is required, and will permit quick removal and replacement of the cutting tools.

The foregoing, and other advantages of my invention and the invention itself will become more apparent from the following description of some embodiments thereof, taken in conjunction with the accompanying drawings.

In the drawings,

Figure 1 is a top plan view of an improved inside flash removing device embodying my invention;

Fig. 2 is a section taken on line 2—2 of Fig. 1, showing the device operatively disposed within a length of tube;

Figure 6:
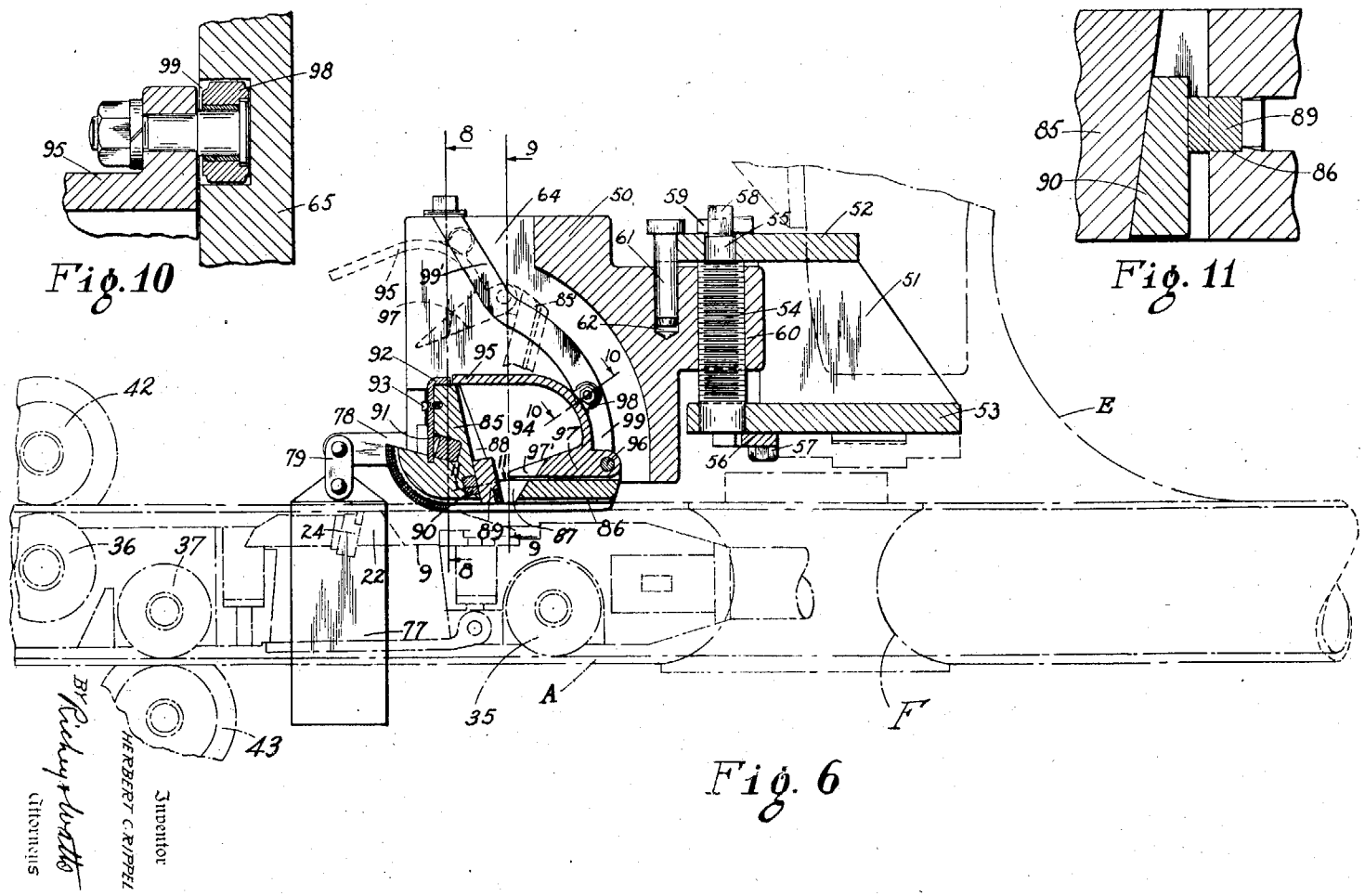
Fig. 6 is a vertical section of an outside flash remover embodying my invention, combined with the inside flash remover of Figs. 1 to5.

Figs. 8, 9, 10 and 11 are sectional views of the outside flash remover taken on the lines 8—8, 9—9, 10—10 and 11—11 respectively of Fig. 6, Figs. 10 and 11 being on an enlarged scale.

Throughout the drawings and specifications, like parts have been designated by like reference characters.

The device shown in Figs. 1 to 5, comprises a tool carrying means or plug 5 having its end 6 attached to a rod 7 anchored at a point in advance of the welding throat (not shown) in any well known manner. The plug 5 is recessed, as at 8, to receive a tool holder or shoe 9, the extension 10 of recess 8 providing a space into which the shoe may be moved when it is to be removed from the plug. Radial cylindrical recesses 11 and 16, having reduced openings 12 and 19 respectively, are fitted with cylindrical blocks 14 and 18 which rest on resellient members 13 and 17 respectively. These blocks support the shoe 9. These members 13 and 17 permit slight movement of the blocks and shoe relative to the plug 5 to compensate for variations or irregularities in the pipe A within which the device is disposed.

The block 14 is provided with a knob 15 to engage in a key slot 20a of shoe 9 while block 18 is recessed as at 20 to engage the beveled end 1 of the shoe.

Figure 3:
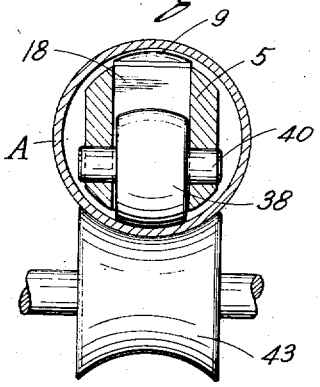
Fig. 3 is a vertical section taken on line 3—3 of Fig. 2.
Figure 4:
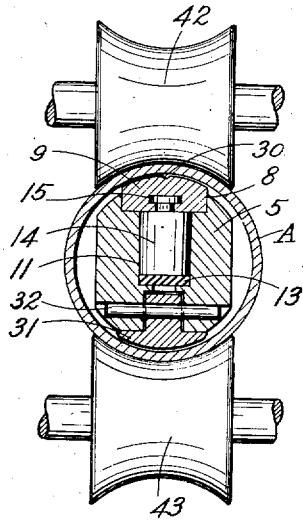
Fig. 4 is a vertical section taken on line 4—4 of Fig. 2.
Figure 5:
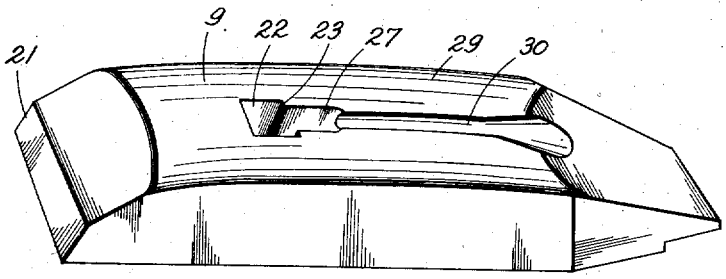
Fig. 5 is a perspective view of the tool holding shoe or block used in conjunction with my flash removing device.

As best shown in Figs. 1, 2 and 5, the shoe 9 has an opening 22 extending therethru defined by walls which diverge from the outer surface of the shoe, this opening being enlarged as at 23. A cutting tool 24 is positioned in opening 22 as by a screw 26, and is maintained at the desired cutting angle and position by a wedge 25 in the enlargement 23 of the opening. The portion 27 of opening 22 serves as an opening thru which hot, severed flash metal may pass thru shoe 9, and communicates with a chamber 28 formed in plug 5. The surface 29 of shoe 9 is curved, to conform generally to the inside surface of the tubular article A and is grooved from opening 22 to the forward beveled end to provide a recess 30 to straddle and guide the unsevered flash of the seam metal.

The chamber 28 has a discharge opening thru which severed flash metal may pass. A cover 31 pivoted to pin 32 in plug 5 serves to close that discharge opening when the plug is in article A, for the latter keeps the cover in closed position. The weight of the cover 31 and severed flash metal thereon is such as to cause the cover to swing about the pivot 32 when the article A has moved beyond the device. Such movement permits the severed flash metal to fall out of or be removed from the chamber 28.

The plug 5 is positioned within the article A by a plurality of rollers 35, 36, 37 and 38 mounted on axles 34, 39, 40 and 41 respectively and disposed in recesses in plug 5, so that only small portions extend beyond the surface of the plug. These rollers engage the opposed inner surfaces of the article and position the plug therein relative to those walls.

The positioning of the cutting tool relative to the welded seam is accomplished by adjustment of the tool in the tool carrying means and the use of members 13 and 17 of proper thickness. The tool will be automatically maintained in such predetermined position, even when the article A is somewhat irregular, by the resilient members 13 and 17, and will thus leave a predetermined amount of seam metal on the article, that is, it will not remove either too much or not enough of the flash metal. The rollers 36, 37 and 38 are directly opposed to outside rollers 42, 43 and 44 which press the pipe against these inside rollers, so that they exert a planishing action on the inner surface of the pipe A, particularly across the heated seam metal from which the flash portion has been removed by the tool 24, thus smoothing and polishing the metal and refining its grains.

In Figs. 6 to 11 inclusive, is illustrated another embodiment of my invention, particularly adapted to remove hot plastic flash metal from the outside of a longitudinal seam weld of a tubular metal article, this embodiment being combined, in Fig. 6, with the apparatus of Figs. 1 to 5.

The outside flash remover of Figs. 6 to 11 inclusive is described as follows: The housing 50, which anchors the tool carrying means, is attached to a yoke 51, which may be secured to a fixed part of a welding machine, for example, to the stand holding rolls F, closely adjacent to the discharge side of the welding electrodes E. The yoke includes horizontally disposed parallel upper and lower arms 52 and 53 respectively, and a vertical threaded post 54. The upper end of the post 54 is reduced in diameter at 55 and is rotatably journaled in the arm 52 with the shoulder of the post adjacent the threaded portion bearing against the inside of the upper arm. The lower end of the post is rotatably journalled in the lower arm and is held therein by a clamping member 56 secured to the yoke by the cap screws 57. The upper end of the post extends through the yoke arm 52 and is provided with a squared end 58 having a transverse slot therethrough adapted to receive a wedge 59 resting on the upper surface of the yoke arm.

The housing 50 has a threaded boss 60 in which the post 54 is threaded. The housing may thus be moved vertically by rotating the post 54. Lateral swinging movement of the housing is prevented when pin 61 is in position in an aperture or slot in the end of the arm 52 and in recess 62 of the housing. The pin 61 may be quickly removed to permit the housing to be swung laterally.

The body of the housing has an irregular recess 64, as best shown in Fig. 6, in which is disposed a tool holder, about to be described. A pair of bearing or trunnion blocks 68 are mounted for reciprocation in openings 67 in the walls 65 and 66 of housing 50 and are urged toward one end of the openings by helical springs 71 disposed in cylindrical chambers 70 in the side walls, and seated at one end on posts 69 on the blocks, and at the other end on adjusting plugs 73 which are screw threaded into counterbores 74 in the cylinders 70.

The bearing blocks rotatably support a shaft 75 extending between the arms of the housing. The shaft is adapted to be rotated counter clockwise by a weight 77 connected to a lever 78 by a link 79, which lever is integral with a boss 80 disposed on the squared end 76 of the shaft 75. The amount of rotation of the shaft is limited by a second lever 81 also integral with the boss 80 but extending in the opposite direction (Fig. 7) and adapted to contact with a stop 82 secured to the side of the housing by a cap screw 84. Although but one weight 77 is shown, two such weights may be provided, one being placed in each end of the shaft 75.

Figure 7:
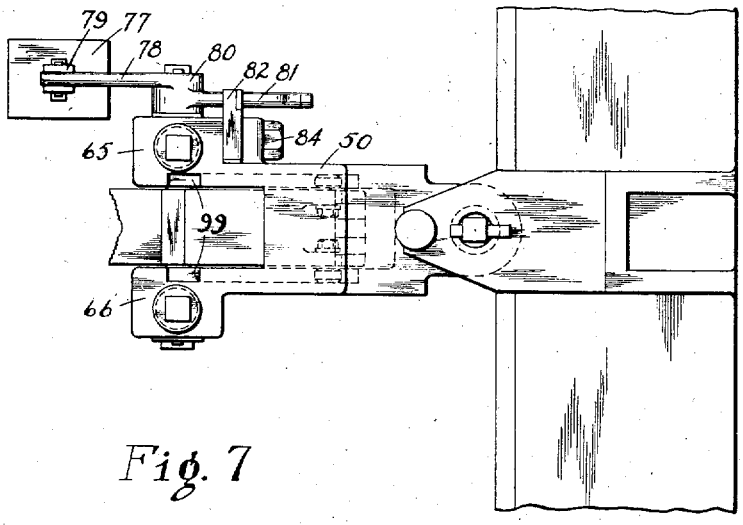
Fig. 7 is a plan view of a part of the apparatus of Fig. 6.
Figure 9:
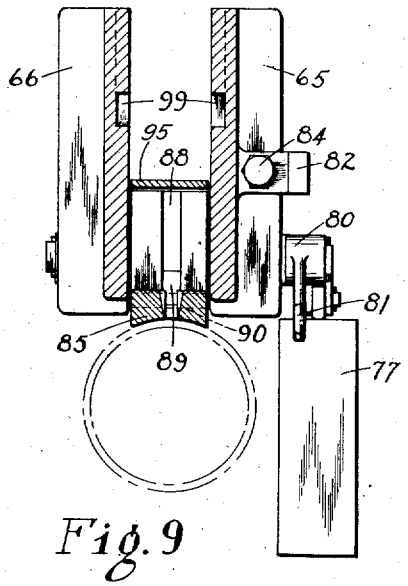
Figure 8:
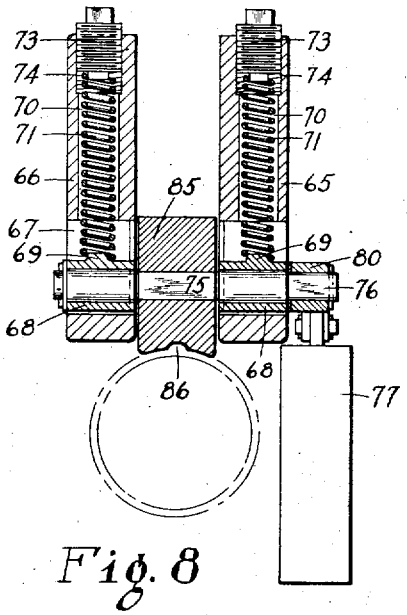

The mid-portion of the shaft 75 is square and carries a tool holder or shoe 85 having a heel portion. The shoe is sufficiently wide to bridge the space between the walls 65 and 66 but has clearance which permits free pivotal and limited lateral movement therebetween. The article engaging surfaces of the shoe and heel are curved transversely and contoured as best shown in Figs. 7 to 9 inclusive, to conform to the shape of the article. A groove 86 extends longitudinally of the shoe from end to end and is of sufficient depth and width to span the flash metal projecting from the seam. The heel portion of the shoe is curved longitudinally on the arc of a circle and the surface is knurled or roughened for a purpose later to be described.

An opening through the tool holder 85 is formed by diverging walls opening toward the top of the shoe. A guideway 88 in the rear wall of the opening (Figs. 6 and 9), adjustably supports a cutting tool 89, which tool is retained in the guideway by wedge 90 extending through a transverse keyway in the shoe.

The shoe has a transverse, rearwardly opening slot 91 which permits the shoe to be slipped on the shaft. The shoe may be locked thereon by an angular keeper 92 secured to the shoe by a cap screw 93.

The tool carrier is recessed to form a chamber 94 partly enclosed by the walls 65 and 66, and by a curved lid or closure member 95 pivoted to the toe of the shoe at 96 and having an integral arm 97 extending across the bottom of the chamber. The end of the arm 97, is slotted at 97' to register with the opening 85.

The closure member is adapted to be opened and closed by rotational movement of the shoe. The means for effecting this opening comprises a pair of rolls 98 connected to the closure member and extending into slots or guideways 99 formed in the walls 65 and 66 of the housing.

The position of the housing is first adjusted as best shown in Figs. 6 and 8, so that when the shoe contacts with the article there will be a slight gap between the bearing blocks 68 and ends of the guideways 67 opposite to the springs. This adjustment insures maintenance of the predetermined adjustment of the cutter relative to the article even when small irregularities are present in the tube.

The already described inside flash remover shown in Figs. 1 to 5 is shown in Fig. 6 in assembled position with respect to both the outside flash remover and the welding means indicated by roller electrode E. It will be noted that the rollers 36 and 37 are opposed respectively to rollers 42 and 43, which are the same as rollers 42 and 43 of Fig. 2. It will further be noted that both the outside cutter 89 and the inside cutter 24 are positioned closely adjacent to the place, represented by electrode E where the seam welding takes place. The location of each cutter with respect to the place of welding is dependent to some extent on the speed of travel of the pipe or tube, but is within the space traveled by the pipe or tube while the flash metal is hot and plastic.

The operation of the above described apparatus is substantially as follows:

After the devices have been adjusted, just as described, a tubular article, such as a pipe or tube, is welded as by the electric resistance butt weld means indicated, burr or flash being formed on the inside and outside of the pipe or tube along the seam. Relative movement between the article and these devices is produced. Preferably the welded article is moved axially past these devices. The leading end of the article contacts with the knurled heel of shoe 85 and rotates the shoe clockwise until the shoe engages the article as shown in Fig. 6 on each side of the seam, with the outside flash metal running thru the groove 86, and with the cutting tool 89 in the path of travel of the hot plastic flash metal. As the tube passes the shoe, the cutting edge of the tool severs the hot plastic flash metal from the seam and directs the severed flash metal through the opening 87 in the tool holder and into the chamber 94. The planishing roll 42 smoothes out any irregularities left by the tool and on the seam metal and works and refines the grains. The severed, hot flash metal accumulates and curls up in chamber 94. When the article has passed completely beyond the shoe, the weight 77 rotates the shoe counter clock-wise in the housing and carries the toe portion away from the article, under control of rollers 98 traveling in the guideway 99. When the rollers reach the straight portion 99' of the guideways, the direction of travel of the rollers 98 is changed. This change moves the lid into open position and the arm 97 connected thereto kicks the flash metal out of the chamber. Rotation of the shoe is stopped by the arm 81 engaging the stop 82, the final position taken by the lid being best shown by the dotted lines in Fig. 6. The device is now in condition for repetition of those operations on any other article.

While the outside flash is being removed, as just described, the inside flash is also being removed. As the welded article with hot plastic flash metal passes over the plug 5, its opposite walls are engaged by the rollers and by the surface 29 of the shoe 9. The flash is guided by groove 30 to the tool 24 which severs the flash and directs it thru opening 22. This severed metal is collected in chamber 28 from which it may be removed after the pipe has passed therebeyond by swinging cover 31 on pin 32 and allowing the metal to fall out, or by pulling it out. The planishing rolls 36 and 42 roll the seam and remove tool marks or irregularities in the seam metal surfaces.

When hot plastic metal is severed from both the outside and inside of the welded seam, as by the apparatus of Fig. 6, the rollers 42 and 43 simultaneously planish both the outer and inner surfaces of the highly heated weld metal from which the hot plastic flash metal has been removed, thereby smoothing the metal, eliminating tool marks and irregularities, polishing the metal and refining the grain.

Although I have shown the flash removers as operating simultaneously on a pipe, it will be understood that either device may be used in the absence of the other device and that, with slight obvious mechanical changes, the devices may be used to sever flash from a seam disposed at other places than in the top part of a pipe or tube, as shown.

The operation of the inside flash remover of Figs. 1 to 5, as above described, is substantially the same whether used with the outside flash remover or separately. In other words, when used separately, the device of Figs. 1 to 5 is assembled with a welder substantially as shown in Fig. 6 and inside a tube welded by the welder as shown in Figs. 2 and 6. When the leading end of the tube being welded reaches the cover 31 it moves that cover to the position shown in Fig. 2, if not already there, then the still hot, plastic flash metal is progressively severed from the tube by tool 24 and is collected in chamber 28. When the trailing end of the tube being welded passes beyond cover 31, it may open, or be opened manually, and the collected flash may be removed from chamber 28.

It will be obvious, from the foregoing disclosure, that the hot, plastic severed flash metal, has no tendency to clog the cutting tools but on the contrary is directed thru the progressively enlarged opening just in front of the tool so that clogging is prevented. Moreover, the tool is caused to follow the pipe and thereby to remove all but a predetermined amount of flash metal from the seam metal. The rollers in plug 5 roughly position the tool in the pipe while the blocks 14 and 18, washers 13 and 17 and shoe 9 produce and maintain the fine adjustment of the tool and cause it to follow irregularities in the pipe while preventing removal of too much or not enough flash metal. The shoe, tool and counterweight of the outside device, act to accomplish a similar result on the outside of the seam.

The tools of both devices are readily removed and replaced and have long cutting life because the hot flash metal is rapidly removed from contact with them and does not cover and cool on them.

Additional apparatus broadly embodying the present invention is disclosed and specifically claimed in the patent to Lawrence H. Park, No. 2,025,422 issued December 24, 1935.

Having thus described my invention so that those skilled in the art may understand the same, I have set forth what I desire to secure by Letters Patent in the claims.

I claim:

1. A device for removing welding flash metal from a tubular metal article comprising a tool holder having an opening therethru defined by diverging walls, a cutting tool adjacent to the opening, means for maintaining the tool in a predetermined position relative to a longitudinal welded seam of an axially moving, substantially cylindrical, tubular metal article to sever hot, plastic, welding flash metal from said article, and means including an uninterrupted surface of the tool for directing the hot, plastic, severed flash metal thru said opening.

2. A device for removing welding flash metal from a longitudinally welded, tubular metal article comprising a tool holder having an opening therethru defined by diverging walls and disposed in predetermined position relative to such an article, the tool holder having a groove to span hot, plastic, flash metal on said article and to permit the holder to engage the article adjacent to the flash metal, a cutter carried by the tool holder for removing all but a predetermined amount of the hot plastic flash metal from the article while the latter is in substantially undeformed condition, said tool holder having an opening therethru defined by diverging walls, and means including an uninterrupted surface of the tool to pass the hot plastic metal severed by the tool thru said opening.

3. A device for removing welding flash metal from the seam of a longitudinally welded, tubular metal article comprising a tool holder shaped and positioned to engage such an article, while substantially cylindrical, adjacent to the flash metal and having an opening therethru defined by diverging walls, a cutting tool positioned in said opening to sever hot, plastic, welding flash metal from the article, and means including an interrupted surface of the tool for passing the hot, plastic severed flash metal thru said opening.

4. A device for removing welding flash metal from the seam of a longitudinally welded, tubular metal article comprising a tool holder shaped and positioned to engage such an article, while substantially cylindrical, adjacent to the flash metal and having an opening therethru defined by diverging walls, a cutting tool positioned in said opening to sever hot, plastic, welding flash metal from the article, means including an uninterrupted surface of the tool for passing the hot, plastic severed flash metal thru said opening, and means for planishing the still highly heated surfaces of the article immediately after their engagement with the cutting tool.

5. A device for removing welding flash metal from a longitudinally welded tubular metal article, comprising tool carrying means having a flash collecting chamber, a tool holder in said means having an opening therethru into said chamber and defined by diverging walls, a cutting tool positioned in said opening to sever longitudinally extending hot, plastic, welding flash metal from such an article, and means to direct such metal thru said opening into said chamber, the chamber having a discharge opening thru which collected severed flash metal may pass.

6. A device for removing welding flash metal from a longitudinally welded tubular metal article, comprising tool carrying means having a flash collecting chamber, a tool holder in said means having an opening therethru into said chamber and defined by diverging walls, a cutting tool positioned in said opening to sever longitudinally extending hot, plastic, welding flash metal from such an article, means to direct such metal thru said opening into said chamber, the chamber having a discharge opening thru which severed collected flash metal may pass, and a movable closure for said opening.

7. A device for removing welding flash metal from a longitudinally welded tubular metal article, comprising tool carrying means having a flash collecting chamber, a tool holder in said means having an opening therethru into said chamber and defined by diverging walls, a cutting tool positioned in said opening to sever longitudinally extending hot, plastic, welding flash metal from such an article, means to direct such metal thru said opening into said chamber, the chamber having a discharge opening thru which collected, severed flash metal may pass, and roller means for rolling the still highly heated surface of the article immediately after engagement of the cutting tool therewith.

8. A device for removing welding flash metal from the inside of a longitudinally welded, tubular metal article comprising a plug chambered to collect severed flash and having means to engage the inner walls of, and maintain itself in a predetermined position in, such an article, a tool carried by said plug in one wall of the chamber to sever longitudinally extending hot, plastic, welding flash metal from the weld of such an article and direct the severed plastic metal into said chamber, the chamber having a discharge opening for the severed metal collected therein, and means engageable with the article to close said discharge opening.

9. A device for removing hot welding flash metal from a longitudinally welded, tubular metal article comprising a tool carrier having a chamber and disposed to engage the outside of such an article adjacent to the flash metal thereon, a tool in said carrier positioned to sever longitudinally extending hot, plastic, flash metal from said article and direct it into said chamber, said carrier including means actuated by the article for ejecting severed flash metal from said chamber.

10. A device for removing welding flash metal from a longitudinally welded, tubular, metal article, comprising a plug, means associated therewith for positioning the plug in such an article, a cutter in the plug positioned to sever longitudinal hot, plastic, welding flash from the said article, and means including opposed rollers, one of which is in the plug and adjacent to the cutter for planishing the portion of the article from which the hot plastic flash metal has been severed by the cutter.

11. A device for removing flash metal from a longitudinally welded, tubular metal article, comprising tool carrying means disposed outside of such an article, a cutting tool in said means disposed in a predetermined position relative to longitudinally extending welding flash metal on the exterior of said article, and means actuated by the exterior surface of said article for maintaining the predetermined position of the cutting tool relative to the article and to its flash metal.

12. A device for removing welding flash metal from a longitudinally welded tubular metal article, comprising a plug having a chamber, rotatable members supported by the plug and adapted to engage the inside surface of the article for positioning the plug in the article, a tool holder resiliently supported in the plug and having an opening therethrough into said chamber and defined by divergent walls, a cutting tool positioned in said opening to sever flash metal from the article, said severed metal being directed by the tool and the divergent walls of the tool holder into the chamber, a discharge opening from said chamber and a closure for said opening, said closure adapted to be maintained closed during a severing operation by the metal article and adapted after the severing operation to be opened to discharge the severed metal.

13. A device for removing welding flash metal from a longitudinally welded tubular metal article, comprising a cambered plug having a chamber extending therethrough, rotatable members supported by the plug and adapted to engage the inside surface of the article for positioning the plug in the article, a tool holder resiliently supported in the plug over said chamber and having an opening therethrough into said chamber and defined by divergent walls, a longitudinal groove in the surface of the tool holder to permit the tool holder to engage the tubular article adjacent the flash metal, a cutting tool positioned in said opening to sever flash metal from the article, said severed metal being directed by the tool and the divergent walls of the tool holder into the chamber, a discharge opening from said chamber and a closure for said opening, said closure adapted to be maintained closed during a severing operation by the metal article and adapted after the severing operation to be opened to discharge the severed metal from the chamber.

14. A device for removing flash metal from a longitudinally welded tubular metal article, comprising a housing pivotally supported adjacent the article, a tool holder resiliently and pivotally supported by the housing adjacent the flash metal and having an opening therethrough defined by divergent walls, a cutting tool positioned in said opening for severing the flash metal from the article, said tool holder and said housing providing a chamber for receiving the severed flash metal, a closure for the chamber opened by pivotal movement of said tool holder to permit the flash to be ejected and having a kick-out member extending across the bottom of the chamber adapted to eject the material from the chamber upon opening of the closure, means to pivot the tool holder comprising a shaft for supporting the tool holder, a lever connected to the shaft and means connected to the lever to move the same.

15. A device for removing flash metal from a longitudinally welded tubular metal article, comprising a housing pivotally supported adjacent to the article, a tool holder resiliently and pivotally supported by the housing adjacent the flash metal and comprising a shoe having a longitudinally extending surface adapted to engage the surface of the article and an arcuate friction surface for engagement with the article, said longitudinally extending portion having an opening therethrough defined by divergent walls, a cutting tool positioned in said opening for severing the flash metal from the article, said tool holder and said housing providing a chamber for receiving the severed flash metal, a closure for the chamber adapted to be opened by pivotal movement of said tool holder to permit the flash to be ejected and having a kick-out member extending across the bottom of the chamber adapted to eject the material from the chamber upon opening of the closure, said shoe adapted to be pivoted to a flash severing position by engagement of the article with the arcuate friction surface, means to pivot the tool holder to a non-cutting position comprising a shaft for supporting the tool holder, a lever connected to the shaft and means connected to the lever to move the same.

16. The combination with electrical welding means for progressively forming a weld extending longitudinally of a tubular metal article, of means disposed within the article and closely adjacent to said welding means for severing flash metal from said weld inside of the article.

17. The combination with electrical welding means, including parts engaging the outside of a tubular metal article, for progressively forming a weld extending longitudinally of such article, of means disposed within the article and closely adjacent to said welding means for severing flash metal from said weld inside of the article while said metal is still hot and plastic from the welding operation.

18. The combination with electrical welding means, including rotary electrodes, for forming a weld extending longitudinally of a tubular metal article, of means disposed within the article and closely adjacent to said electrodes for severing flash metal from said weld inside of the article while said metal is still hot and plastic from the welding operation.

19. The combination with electrical means for progressively forming a weld extending longitudinally of a tubular metal article, of means disposed within the article and closely adjacent to said welding means for progressively severing flash metal from said weld inside of the article, and means disposed outside of the article and closely adjacent to said welding means for progressively severing flash metal from said weld outside of the article, and means disposed inside and outside of the article for planishing surfaces of the weld immediately after the severance of flash metal therefrom.

20. The combination with electrical means for progressively forming a weld extending longitudinally of a tubular metal article, of means disposed within the article and closely adjacent to said welding means for severing hot plastic flash metal from said weld inside of the article, means disposed outside of the article and closely adjacent to said welding means for severing hot plastic flash metal from said weld outside of the article, each of said flash removing means being disposed closely adjacent to said welding means, and means disposed on the inside and outside of the article closely adjacent to the said flash severing means for simultaneously planishing the inner and outer surfaces of the still highly heated weld metal immediately after said flash metal has been removed.

21. The combination with electrical means for progressively forming a weld extending longitudinally of a tubular metal article, of means engageable with the article and disposed closely adjacent to the electrical means for severing hot plastic flash weld metal from the said article, and means operatively associated with said flash severing means for collecting the flash as it is severed from said weld.

22. The combination with electrical means for progressively forming a weld extending longitudinally of a tubular metal article, of means disposed respectively inside of and outside of said article and closely adjacent to said electrical means for severing flash metal from said weld while still hot and plastic from the welding operation, and means engaging the inner and outer surfaces of the weld immediately after the severance of said flash for planishing said surfaces.

23. The combination with electric welding means for progressively forming a weld extending longitudinally of a tubular metal article, of cutting means disposed within the article and closely adjacent to said welding means for severing flash metal from the weld inside of the article, and means on either side of said cutting means for maintaining said cutting means in predetermined position relative to the article.

24. The combination with electric welding means for progressively forming a weld extending longitudinally of a tubular metal article, of means including a cutter, disposed within the article and closely adjacent to said welding means for severing hot, plastic flash metal from the weld inside of the article, and planishing means for working the weld metal immediately after removal of metal therefrom by said cutter means.

25. The combination with electric welding means for progressively forming a weld extending longitudinally of a tubular metal article, of means, including a cutter, disposed within the article and closely adjacent to said welding means for severing hot, plastic flash metal from the weld inside of the article, and means operatively associated with said cutter for collecting flash metal severed from the article by said cutter.

26. The combination with electric welding means for progressively forming a weld extending longitudinally of a tubular metal article, of means disposed within the article closely adjacent to said welding means and including a cutter for severing flash metal from the weld inside of the article and supporting means for maintaining the cutter in predetermined position with respect to the article.

HERBERT C. RIPPEL.